US011995932B2

(12) United States Patent
Park

(10) Patent No.: US 11,995,932 B2
(45) Date of Patent: May 28, 2024

(54) SMART DOOR LOCK SYSTEM HAVING DOOR-LOCK AREA INFORMATION DISPLAY FUNCTION AND CONTROL METHOD OF SMART DOOR LOCK SYSTEM

(71) Applicant: SMARTeLOCK CO., LTD., Seongnam-si (KR)

(72) Inventor: Hyung Mo Park, Gwangju-si (KR)

(73) Assignee: SMARTELOCK CO., LTD., Seongnam-si (KR)

(*) Notice: Subject to any disclaimer, the term of this patent is extended or adjusted under 35 U.S.C. 154(b) by 413 days.

(21) Appl. No.: 17/387,034

(22) Filed: Jul. 28, 2021

(65) Prior Publication Data

US 2022/0122393 A1 Apr. 21, 2022

(30) Foreign Application Priority Data

Oct. 16, 2020 (KR) ........................ 10-2020-0133960

(51) Int. Cl.
*G07C 9/00* (2020.01)

(52) U.S. Cl.
CPC ..... *G07C 9/00817* (2013.01); *G07C 9/00309* (2013.01); *G07C 2009/00976* (2013.01)

(58) Field of Classification Search
None
See application file for complete search history.

(56) References Cited

U.S. PATENT DOCUMENTS

| | | | | |
|---|---|---|---|---|
| 9,032,498 B1 * | 5/2015 | Ben Ayed | G06F 21/35 726/9 |
| 2002/0180582 A1 * | 12/2002 | Nielsen | G07C 9/21 340/5.6 |
| 2008/0122595 A1 * | 5/2008 | Yamamichi | G07C 9/00817 340/426.16 |
| 2015/0038078 A1 * | 2/2015 | Huang | H04W 76/10 455/566 |
| 2016/0201251 A1 * | 7/2016 | Zhang | D06F 39/14 700/275 |
| 2018/0268633 A1 * | 9/2018 | Kwon | G07C 9/00857 |
| 2019/0368227 A1 * | 12/2019 | Tabib | E05B 45/06 |
| 2020/0028672 A1 * | 1/2020 | Tang | H04L 9/3297 |
| 2022/0327877 A1 * | 10/2022 | Pukari | G06F 21/35 |
| 2024/0025374 A1 * | 1/2024 | Ohara | B60R 25/24 |

FOREIGN PATENT DOCUMENTS

KR 10-1767496 8/2017

* cited by examiner

*Primary Examiner* — Carlos Garcia
(74) *Attorney, Agent, or Firm* — LEX IP MEISTER, PLLC

(57) ABSTRACT

A smart door lock system and a control method thereof are proposed. More specifically, in the smart door lock system and the control method thereof, door-lock area information is displayed on an outer side of a door, the door-lock area information including: any one or more pieces of door-lock area state information on states of a door lock area entered through a door lock in which a smart door lock is installed; and door-lock area user information of users who use the door lock area.

9 Claims, 8 Drawing Sheets

SMART DOOR LOCK SYSTEM HAVING DOOR-LOCK AREA INFORMATION DISPLAY FUNCTION AND CONTROL METHOD OF SMART DOOR LOCK SYSTEM

CROSS REFERENCE TO RELATED APPLICATION

The present application claims priority to Korean Patent Application No. 10-2020-0133960, filed Oct. 16, 2020, the entire contents of which is incorporated herein for all purposes by this reference.

BACKGROUND OF THE INVENTION

Field of the Invention

The present invention relates to a smart door lock system and a control method thereof and, more particularly, to a smart door lock system having a door-lock area information display function and a control method of the smart door lock system, wherein door-lock area information is displayed on an outer side of a door, the door-lock area information including: any one or more pieces of door-lock area state information on states of an area (hereinafter referred to as "door lock area") entered through a door lock in which a smart door lock is installed; and door-lock area user information of users who use the door lock area (hereinafter referred to as "door-lock area user information").

Description of the Related Art

As crime increases in modern society, interest in security is rapidly growing. Due to such interest and the development of electronic technologies such as Internet technology, wireless communication technology, and control technology, a focus on the door lock technology field has changed from a mechanical lock device using a mechanical key to a digital door lock device using information on biometrics such as personal identification number (PIN), fingerprint, iris, and face recognition.

In general, the digital door lock includes: an offline digital door lock that serves as a digital lock device using only its own function without an internet connection; and an online digital door lock that serves as a lock device communicating through wireless communication and Internet communication.

In a typical digital door lock, authentication is performed by comparing a registered PIN number with a PIN number input from a user or read from an RFID card, and the like, or by comparing previously registered biometric information with other biometric information obtained through a device for obtaining the biometric information, wherein authentication failure sound is output when the authentication is failed, whereas authentication success sound is output when the authentication is successful, and then the door lock device is unlocked.

As such, the conventional digital door lock is not equipped with a device that may operate both online and offline, so there is a problem in that services with diversity are not provided to users and clients.

In addition, since the conventional digital door lock simply performs a function of locking and unlocking a door and does not provide any information on states of a door lock area entered through the door and states of users using the door lock area, there is a problem that the users using the door lock area have no way to notify a third party of their states and the users may be disturbed by the third party.

In addition, since the conventional digital door lock does not provide any information to the third party outside the door, there is a problem that the third party may interfere with the users of the door lock area because the third party does not know the states of the users of the door lock area and the third party may unnecessarily waste their time in waiting for the users of the door lock area, etc.

DOCUMENTS OF RELATED ART (Patent Document 1) Korean Patent No. 10-1767496 (Registered on Aug. 7, 2017)

SUMMARY OF THE INVENTION

Therefore, an objective of the present invention is to provide a smart door lock system having a door-lock area information display function and a control method of the smart door lock system, wherein door-lock area information is displayed on an outer side of a door, the door-lock area information including: any one or more pieces of door-lock area state information on states of a door lock area entered through a door lock in which a smart door lock is installed; and door-lock area user information of users who use the door lock area.

A smart door lock system having a door-lock area information display function according to the present invention for achieving the above objective includes: a smart door lock part including a door lock installed on a door of a smart lock application part having a door lock area to lock and unlock the door, and an e-paper part that is a display means, the smart door lock part being configured to display door-lock area information on the e-paper part after receiving, storing, and setting door-lock use setting information including the door-lock area information, compare a door-lock unlock code with a preset door-lock lock/unlock code upon reception of a door lock signal including the door-lock unlock code, and lock or unlock the door lock upon match; and a door-lock management part configured to store door-lock identification information of the smart door lock part for at least one or more door lock areas, manage the door lock area, provide digital key information on a digital key to a user who requested to use the door lock area when use of the door lock area is requested for any door lock area, generate the door-lock area information, and then transmit the door-lock use setting information including the door-lock area information to the smart door lock part.

Here, the digital key may include any one or more of components including: a RFID card configured to store the door-lock lock/unlock code, and transmit a door-lock lock/unlock signal including the door-lock lock/unlock code upon contact with the smart door lock part; and a smart terminal configured to receive and store the door-lock lock/unlock code from the smart door lock part, and transmit the door-lock lock/unlock signal including a door-lock lock code or the door-lock unlock code to the smart door lock part when locking or unlocking the door lock is requested by the user in the door lock area.

In addition, the smart door lock part may include: a lock terminal storage configured to store the door-lock lock/unlock code and the door-lock use setting information including the door-lock area information; a short-range wireless communication part configured to receive and output the door-lock lock/unlock code and the door-lock use setting information; the door lock; an input and output part including e-paper; and a lock terminal controller configured to display the door-lock area information on the e-paper part after receiving the door-lock use setting information including the door-lock area information to store and set the door-lock use setting information in the lock terminal storage, compare the door-lock unlock code with the preset door-lock lock/unlock code upon reception of the door lock signal including the door-lock unlock code, and control the door lock upon match to lock or unlock the door lock.

In addition, the short-range wireless communication part may include a first short-range wireless communication part wirelessly connected to a wired and wireless data communication network to access an Internet network, and the lock terminal controller may receive the door-lock use setting information through the first short-range wireless communication part.

In addition, the door-lock management part may transmit the door-lock use setting information to a smart terminal of the user, the short-range wireless communication part of the smart door lock part may include a second short-range wireless communication part configured to perform terminal-to-terminal wireless communication, and the lock terminal controller may receive the door-lock use setting information from the smart terminal through the second short-range wireless communication part.

In addition, the e-paper part may be configured to shut off power supply after initial power supply, express display data even when power is shut off, and supply the power only when the display data is changed.

In addition, the input and output part may further include a lock terminal input part including a state change button for changing the door-lock area information, and the lock terminal controller may sequentially change two or more pieces of the door-lock area information each time the state change button of the lock terminal input part is pressed for input and display the door-lock area information on the e-paper part.

In addition, the system may further include: a lock terminal input part installed in the door lock area and configured to receive and display the door-lock area information set from the smart door lock part, include a state change button so as to transmit area-state information change information requesting a change of the door-lock area information when the state change button is pressed, and receive and display the changed door-lock area information accordingly, wherein the lock terminal controller may receive the area-state information change information through the short-range wireless communication part, sequentially change at least two or more pieces of the door-lock area information, display the door-lock area information on the e-paper part, and transmit the changed door-lock area information to the lock terminal input part.

In addition, the door-lock area information may include any one or more pieces of information including logo, door-lock area user information, room number, user state information, welcome phrase, and a lock terminal controller may simultaneously or sequentially display, on the e-paper part, the information including the logo, door-lock area user information, room number, user state information, welcome phrase.

A control method of a smart door lock having a door-lock area information display function according to the present invention for achieving the above objective includes: setting use of a door lock area, wherein digital key information for a digital key may be provided to a user requesting the use of the door lock area when a door-lock management part requests the use of the door lock area for any door lock area, door-lock area information is generated, and then door-lock use setting information including the door-lock area information is transmitted to a smart door lock part; and driving the smart door lock, wherein the smart door lock part may display the door-lock area information on an e-paper part, a door-lock unlock code may be compared with a preset door-lock lock/unlock code upon reception of a door lock signal including the door-lock unlock code, and the smart door lock may be locked or unlocked upon match.

The setting of the use of the door lock area may include: monitoring a smart door lock use event, wherein whether the smart door lock use event occurs may be monitored; setting use of a door lock, wherein the door lock area may be designated from either an administrator or the user when the smart door lock use event occurs, and the digital key for the smart door lock part corresponding to the designated door lock area may be provided to the user; generating e-paper, wherein at least one or more pieces of the door-lock area information according to a use environment of the door lock area may be received from any one or more of the administrator and the user and set after setting the use of the door lock; and setting the door-lock area information, wherein the set door-lock area information may be transmitted to the corresponding smart door lock part so as to set the door-lock area information.

The setting of the door-lock area information may include: determining a smart door lock communication type, wherein whether the smart door lock part may be an online type or an offline type is determined; setting online door-lock area information, wherein the door-lock area information may be transmitted to the smart door lock part when the smart door lock part is the online type; and setting offline door-lock area information, wherein the door-lock area information may be transmitted to a smart terminal of the user through the wired and wireless data communication network when the smart door lock part is the offline type, and the smart terminal may be allowed to transmit the door-lock area information to the smart door lock part through terminal-to-terminal short range wireless communication.

The driving of the smart door lock may include: determining whether the door lock signal is received, wherein whether the door lock signal is received through a short-range wireless communication part may be monitored; determining a door-lock signal type, wherein, when the door lock signal is received, whether the door lock signal is the door-lock use setting information or a door-lock lock/unlock signal may be determined; setting use of the smart door lock, wherein, when the door lock signal is the door-lock use setting information, the door-lock area information may be displayed on the e-paper part after performing use setting for the digital key included in the door-lock use setting information; and driving a door lock, wherein, when the door lock signal is the door-lock lock/unlock signal, the door lock may be locked or unlocked after authentication by the door-lock lock/unlock code.

The setting of the use of the smart door lock may include: setting use of the door lock, wherein use setting for the digital key included in the door-lock use setting information may be performed; setting the e-paper, wherein, after performing the use setting of the door lock, e-paper information, which is the door-lock area information included in the door-lock use setting information, may be extracted and stored, and then basic door-lock area information may be displayed on the e-paper part; and changing a display of the door-lock area information, wherein, when the user requests to change the display of the door-lock area information, the door-lock area information selected by the user may be changed and displayed.

Since the present invention may be applied to both a smart door lock for an offline environment that is unable to connect to the Internet and a smart door lock for an online environment that is able to access the Internet, there is an effect that scalability may be provided according to client's needs and installation environment.

In addition, in the present invention, since states of a door lock area and states of users of the door lock area may be displayed and notified to a third party, there is an effect that the users may be able to notify their schedules to the third party when necessary and prevent interference of the third-party.

In addition, in the present invention, since door-lock area information is displayed on an outer side of a door according to states of a door lock area and states of users of the door lock area, a visitor who visits the door lock area may easily and quickly recognize the states of the door lock area and the states of the users of the door lock area, whereby there is an effect that unnecessary waste of time of the visitor may be prevented.

In addition, in the present invention, since e-paper is applied, there is an effect that almost no power is lost without using a separate battery.

DETAILED DESCRIPTION OF THE INVENTION

The present invention may be embodied in various other forms without departing from the technical spirit or main characteristics thereof. Accordingly, exemplary embodiments of the present invention are merely illustrative in all respects and should not be construed as limiting.

It will be understood that, although the terms “first”, “second”, etc. may be used herein to describe various components, these components should not be limited by these terms.

These terms are only used for the purpose of distinguishing one component from another component. For example, without departing from the scope of the present invention, a first component may be referred to as a second component, and similarly, the second component may be referred to as the first component.

It will be understood that when a component is referred to as being “coupled” or “connected” to another component, it can be directly coupled or connected to the other component or an intervening component may be present in between.

In contrast, when a component is described as being “directly connected”, “directly coupled”, or “directly linked” to another component, it should be understood that there are no intervening component present therebetween.

The terminology used herein is for the purpose of describing particular exemplary embodiments only and is not intended to be limiting. As used herein, the singular forms are intended to include the plural forms as well, unless the context clearly indicates otherwise.

In addition, it will be further understood that the terms “comprise”, “include”, “have”, etc. when used in the present application, specify the presence of stated features, integers, steps, operations, elements, components, and/or combinations of them but do not preclude the possibility of the presence or addition of one or more other features, integers, steps, operations, elements, components, and/or combinations thereof.

Unless otherwise defined, all terms including technical and scientific terms used herein have the same meaning as commonly understood by those skilled in the art to which the present invention belongs.

It will be further understood that terms as defined in dictionaries commonly used herein should be interpreted as having a meaning that is consistent with their meaning in the context of this specification and the relevant art and will not be interpreted in an idealized or overly formal sense unless expressly so defined herein.

Hereinafter, a configuration and operation of a smart door lock system having a door-lock area information display function according to the present invention will be described in detail with reference to the accompanying drawings, and a control method of the smart door lock system will be described.

Figure 1:
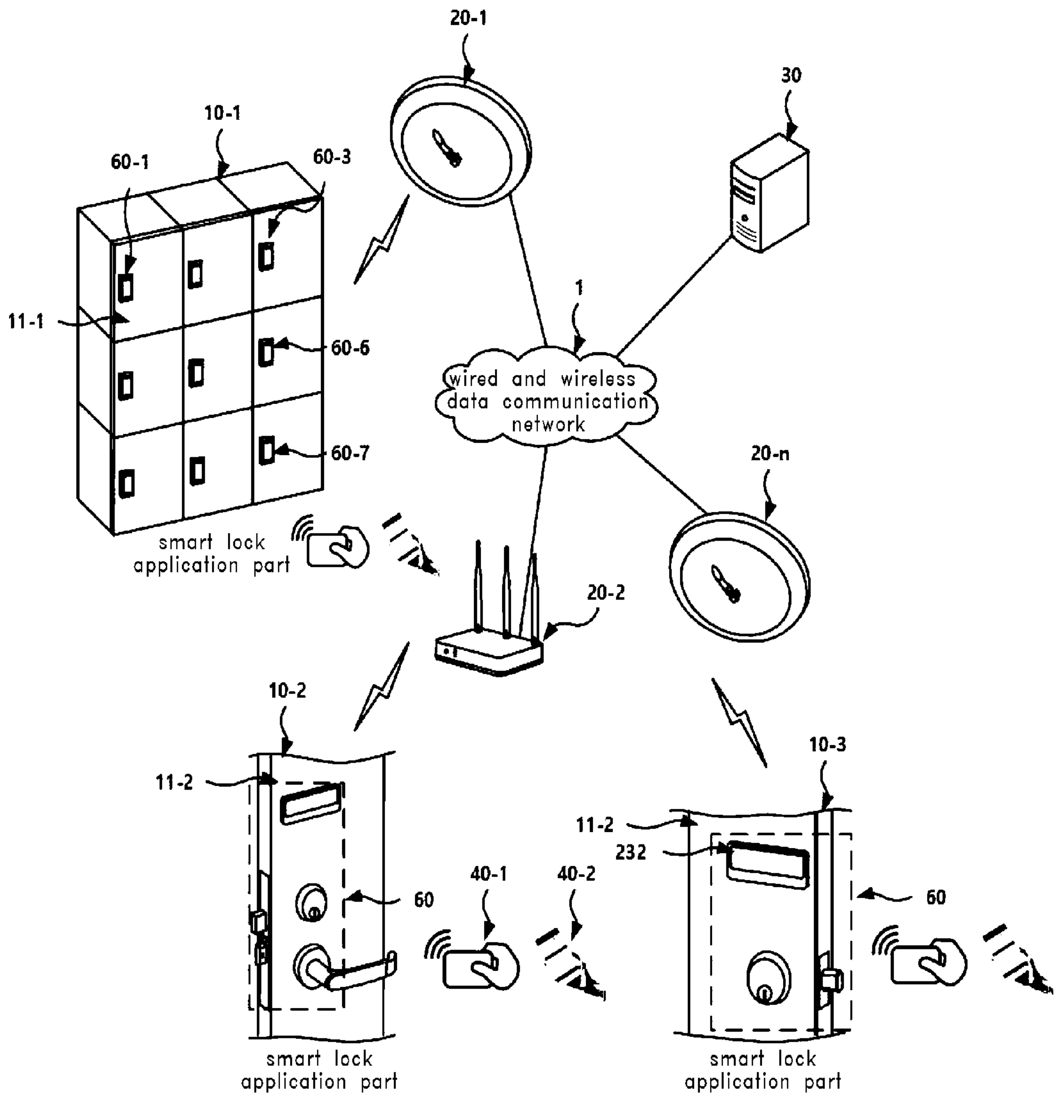
FIG. 1 is a view showing a configuration of a smart door lock system having a door-lock area information display function in an online state according to the present invention.
Figure 2:
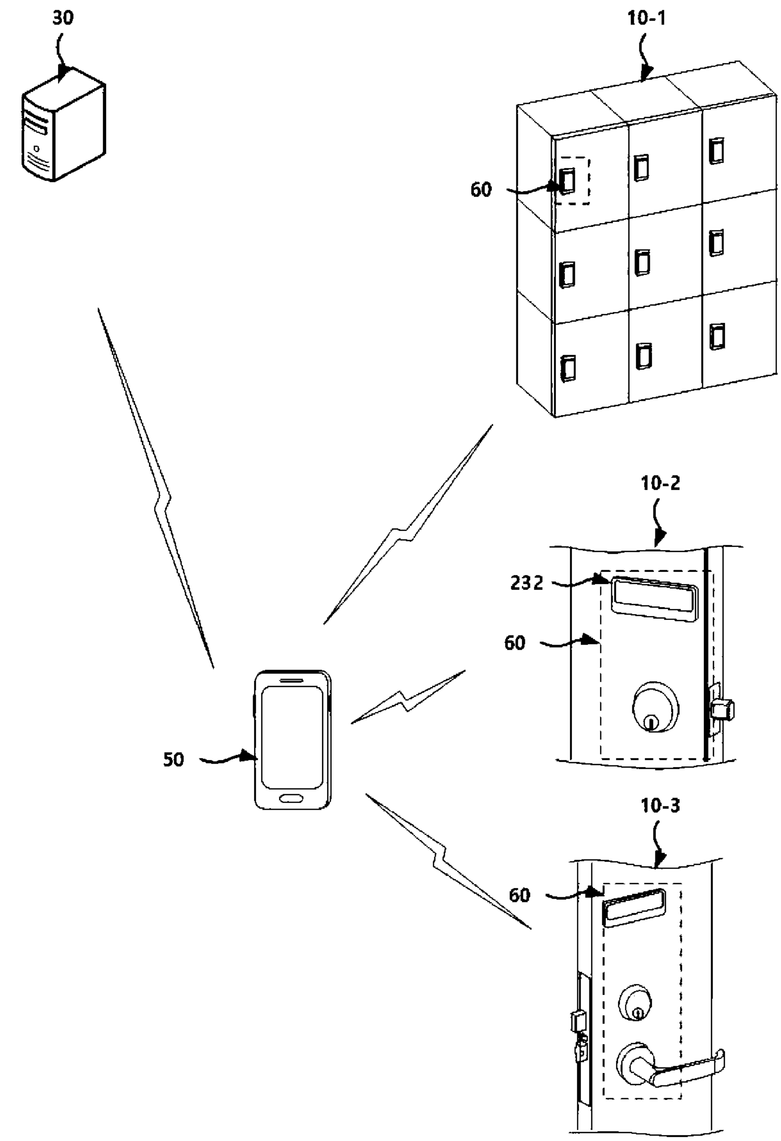
FIG. 2 is a view showing a configuration of the smart door lock system having the door-lock area information display function in an offline state according to the present invention.

FIG. 1 is a view showing a configuration of a smart door lock system having a door-lock area information display function in an online state according to the present invention, and FIG. 2 is a view showing a configuration of the smart door lock system having the door-lock area information display function in an offline state according to the present invention. Hereinafter, it will be described with reference to FIGS. 1 and 2.

The smart door lock system having the door-lock area information display function according to the present invention includes a door-lock management part 30 and a smart door lock part 60, and may further include an access point 20 and a smart terminal 50 of a user according to the exemplary embodiment.

The door-lock management part 30 according to the present invention performs data communication with a smart door lock part 60 through a wired and wireless data communication network 1 and an access point 20 connected to the wired and wireless data communication network 1 when the smart door lock part 60 is an online type according to a first exemplary embodiment, and performs data communication with a smart terminal 50 of a user through a corresponding application (or referred to as "app") when the smart door lock part 60 is an offline type according to a second exemplary embodiment.

The wired and wireless data communication network 1 may be a communication network to which any one or more of networks are combined, the networks including: an Internet network including local area network (LAN); a mobile communication network including a third generation (3G), 4G, and 5G; a WiBro network; a power line network; and the like.

The access point 20 may enable the door-lock management part 30 to connect to the smart door lock part 60 through short-range wireless communication in accordance with a short-range wireless communication protocol such as Wi-Fi and Zigbee, and may enable the wirelessly connected smart door lock part 60 to perform data communication with various devices such as the door-lock management part 30 connected to the wired and wireless data communication network 1.

The door-lock management part 30 may be a client's server or the like, stores and manages door-lock identification information for at least one or more smart door lock parts 60 for each door lock area, stores and manages door-lock area information, including door-lock area state information and door-lock area user information for the door lock area, and information on whether the door lock area is used according to setting selection of the smart door lock part 60.

As a digital key, as shown in FIG. 1, a RFID card 40-1 and a smart terminal 40-2 (or 50 in FIG. 2) of a user may be used.

In addition, the door-lock management part 30 may be able to provide, to the smart terminal 50 of the user who will use the door lock area, digital key information to lock and unlock the smart door lock part 60 of the door lock area according to a lease of the door lock area.

The digital key information may be a door-lock lock/unlock code designated for the smart door lock part 60 of the corresponding door lock area, or may be a door-lock lock/unlock code that is changed at a time when being assigned to a user.

In the latter case, the door-lock management part 30 may have to transmit the generated digital key information to the corresponding smart door lock part 60 and register the digital key information.

In addition, according to the exemplary embodiment, the door-lock management part 30 may be configured to receive, from the smart door lock part 60, digital key information obtained from any one of the smart terminal 40-2 and the RFID card 40-1, which are used as a digital key of a user, and authenticate the digital key of the user by comparing the digital key information with information of a pre-registered digital key, and then unlock the smart door lock part 60 by transmitting a signal such as unlocking a door lock upon successful authentication.

When a request to use a door lock area where a smart door lock part 60 is installed is generated, the door-lock management part 30 transmits, to the corresponding smart door lock part 60 in the requested door lock area, door-lock use setting information including door-lock area state information composed by any one or more of users and administrators.

The detailed configuration and operation of the door-lock management part 30 will be described in detail with reference to FIG. 3 below.

The smart door lock part 60 is provided in a smart lock application part 10 having at least one or more door lock areas, so as to lock or unlock a door at an entrance to an interior of the door lock area. The smart lock application part 10 may be lockers having a plurality of small door lock areas, and may be a hotel, apartment, office building, school, and the like.

When a door lock area is assigned to any user, the smart door lock part 60 according to the present invention receives and stores, from the door-lock management part 30, at least one or more pieces of door-lock area state information that is information on states of the door lock area and states of users of the door lock area, and displays the door-lock area state information selected by the users on a display means provided on an outer side of a door 11 in the door lock area.

The door-lock area state information may be composed differently and variously depending on a form of the smart lock application part 10. For example, in a case where the smart lock application part 10 is a locker, the door-lock area state information may be a locker number, whether a locker is available, a guidance text, and the like. In addition, in a case where the smart lock application part 10 is in the form of a room, such as the room in a hotel, apartment, office building, school, etc., the door-lock area state information may be user information including a user name of the door lock area, user state information (i.e., occupancy, absence, business trip, vacation, occupancy time information, absence time information, business trip period, etc.), and an information text such as "Do Not Disturb", "Welcome", etc.

According to the exemplary embodiment of the present invention, the smart door lock part 60 has an online type capable of connecting to a wired and wireless data communication network 1 as shown in FIG. 1 and an offline type as shown in FIG. 2.

In the case of the online type, the smart door lock part receives and stores door-lock area state information directly from the door-lock management part 30, and in the case of the offline type, the smart door lock part 60 receives and stores the door-lock area state information from the smart terminal 50 of the user.

The detailed configuration of the smart door lock part 60 will be described in detail with reference to FIG. 4 below.

The smart terminals 40-1 and 50 that may be used as the digital keys 40 are terminals used by the users, and smart door lock applications according to the present invention may be installed therein. The door lock applications may be driving in any one or more of foreground applications and background applications.

The smart terminal 50 receives, from a user, a request to use a smart door lock part 60 of a door lock area for using any door lock area, transmits information on the use request of a smart door lock to the door-lock management part 30, receives door-lock use setting information including door-lock area state information accordingly, and transmits the door-lock use setting information to the smart door lock part 60 through a terminal-to-terminal wireless communication means, so as to set the use of the door lock area.

Figure 3:
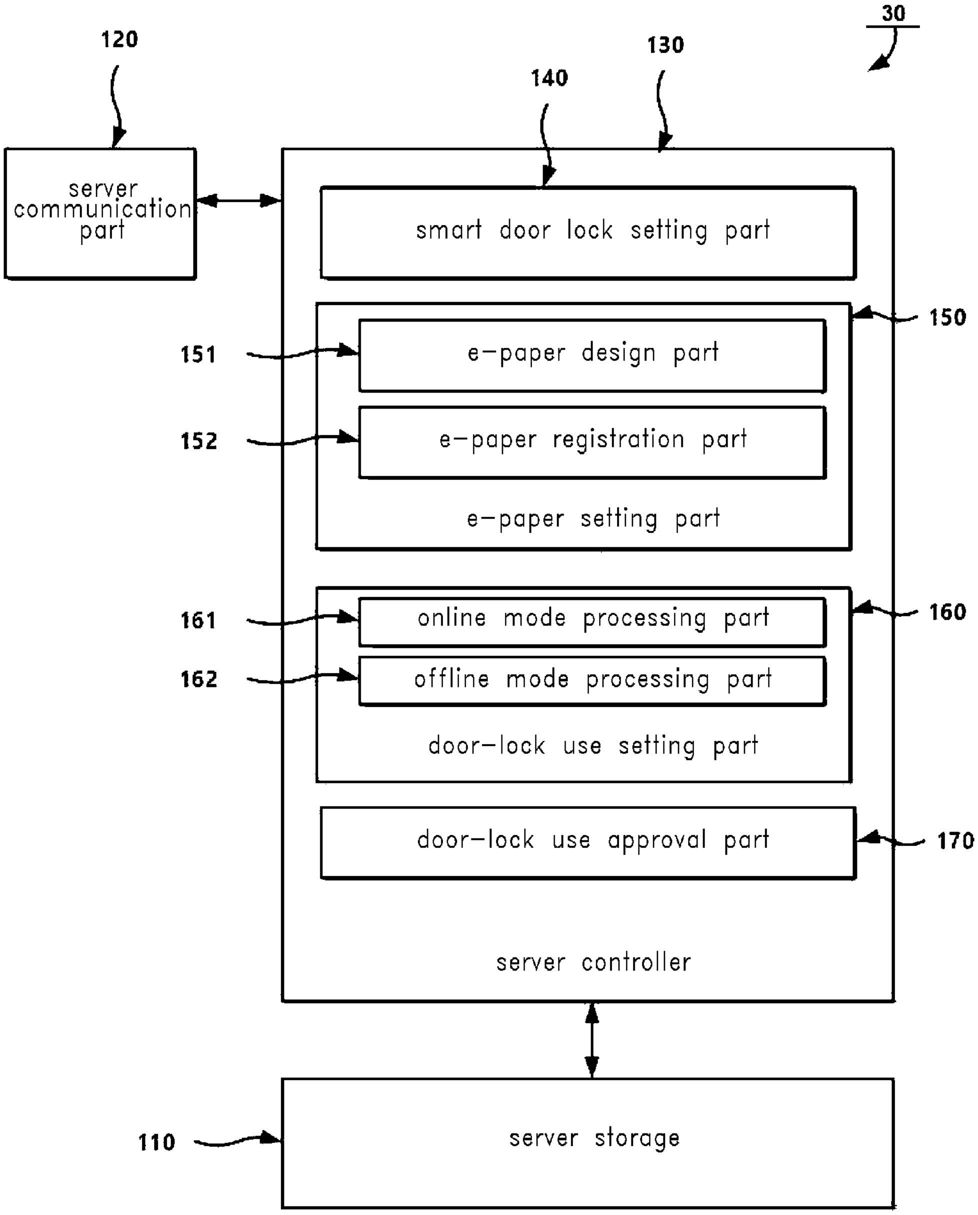
FIG. 3 is a view showing a detailed configuration of a door-lock management part of the smart door lock system according to the present invention.

FIG. 3 is a view showing a detailed configuration of a door-lock management part of the smart door lock system according to the present invention.

Referring to FIG. 3, the door-lock management part 30 includes a server storage 110, a server communication part 120, and a server controller 130.

The server storage 110 includes: a program area configured to store a control program for controlling an electronic operation of the door-lock management part 30 according to the present invention; a temporary area configured to temporarily store data generated during execution of the control program; and a data area configured to semi-permanently store data necessary for executing the control program and data generated during the execution of the control program.

In the data area, information may be stored, the information including: door-lock identification information of a smart door lock part 60 installed for each door lock area according to the present invention; location information of the door lock area corresponding to the door-lock identification information; door-lock area information currently set in the smart door lock part 60; and the like.

The server communication part 120 is connected to a wired and wireless data communication network 1 to perform data communication with devices such as an access point 20 and a smart terminal 50, which are connected to the wired and wireless data communication network 1.

The server controller 130 includes: a smart door lock setting part 140, an e-paper setting part 150, and a door-lock use setting part 160, and according to the exemplary embodiment, further includes a door-lock use approval part 170, and thus, the overall operation of the door-lock management part 30 is controlled.

Specifically, when a user or administrator requests use of a door lock area by accessing through a user terminal (not shown) and an administrator terminal (not shown), the smart door lock setting part 140 provides a smart door lock use setting means (i.e., Graphic User Interface, GUI) to the user terminal or the administrator terminal, receives a designated door lock area to be used, and performs use setting for the smart door lock part 60 in the designated door lock area. The use setting of the smart door lock part 60 may include: the use setting of the corresponding door lock area; generation of digital key information for the smart door lock part 60; and the like.

The e-paper setting part 150 includes an e-paper design part 151 and an e-paper registration part 152, thereby generating, selecting, and registering one or more pieces of door-lock area information to be displayed on an e-paper part of the smart door lock part 60 of the door lock area set to use by the smart door lock setting part 140.

Specifically, after setting the use of the smart door lock part 60 in the door lock area, the e-paper design part 151 provides, to the user terminal or administrator terminal, an e-paper design means capable of inputting texts or designing images such as logos that may indicate door-lock area information by selection of the user or administrator, and maps and stores the images and texts produced accordingly for each one or more of the user, the door lock area, and the smart door lock part 60.

Among the door-lock area information produced through the e-paper design part 151 and a variety of door-lock area information produced and stored in advance in the server storage 110, the e-paper registration part 152 stores and registers, in the server storage 110, the door-lock area information as e-paper information selected by the user or administrator. The e-paper information may further include arrangement information according to the resolution of the e-paper part 232 of the selected at least one or more pieces of door-lock area information.

The door-lock use setting part 160 includes an online mode processing part 161 and an offline mode processing part 162 so that door-lock use setting information including any one or more pieces of information among door-lock area information and a door-lock lock/unlock code that is digital key information set in any one or more of the smart door lock setting part 140 and the e-paper setting part 150 is transmitted to the smart door lock part 60, thereby performing a process of use setting.

Specifically, in a case where the smart door lock part 60 is an online type, the online mode processing part 161 transmits the door-lock use setting information directly to the smart door lock part 60 through the wired and wireless data communication network 1 and the access point 20, thereby performing use setting of a door lock.

Whereas, in a case where the smart door lock part 60 is an offline type, the offline mode processing part 162 transmits the door-lock use setting information to the smart terminal 50 through the corresponding application installed in the smart terminal 50 of the user, and transmits the door-lock use setting information to the smart door lock part 60 to which the smart terminal 50 is connected and used in a terminal-to-terminal short-range wireless communication method, thereby performing the use setting of the door lock.

When a user desires to unlock a door lock of a smart door lock part 60 according to the exemplary embodiment of the present invention, the door-lock use approval part 170 receives a door-lock lock/unlock code from the smart door lock part 60, compares the door-lock lock/unlock code with the previously stored and registered door-lock lock/unlock code for the smart door lock part 60 in the server storage 110 so as to perform authentication according to whether the codes match or not, and transmits door-lock use approval information to the smart door lock part 60 upon successful authentication, thereby enabling the smart door lock part 60 to unlock the door lock.

Figure 4:
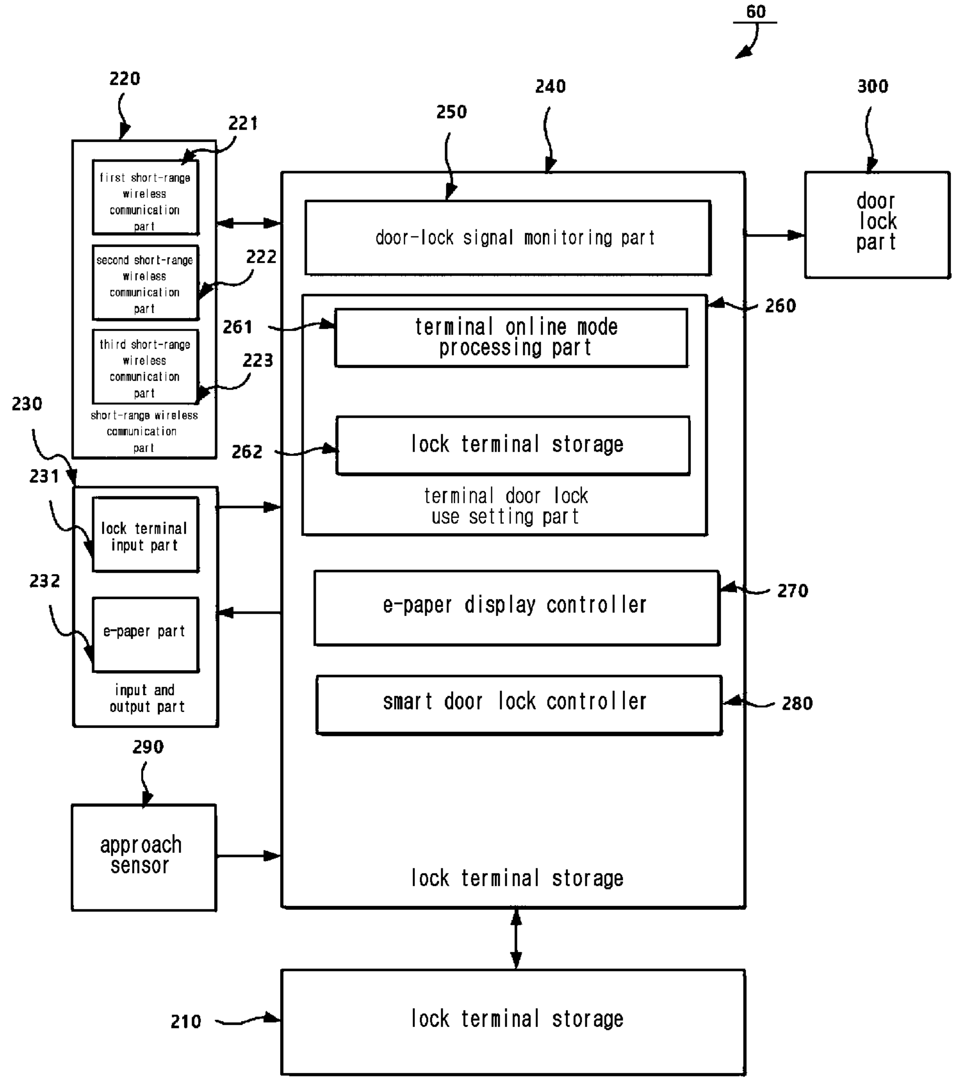
FIG. 4 is a view showing a detailed configuration of a smart door lock part of the smart door lock system according to the present invention.

FIG. 4 is a view showing a detailed configuration of a smart door lock part of the smart door lock system according to the present invention.

Referring to FIG. 4, the smart door lock part 60 includes: a lock terminal storage 210, a short-range wireless communication part 220, an input and output part 230, a lock terminal controller 240, and a door lock part 300, and may further include an approach sensor 290 according to the exemplary embodiment.

Specifically, the lock terminal storage 210 includes: a program area configured to store a control program for controlling the overall operation of a smart door lock part 60; a temporary area configured to temporarily store data generated during execution of the control program; and a data area configured to store data necessary for the executing of the control program. In the data area, at least one or more pieces of door-lock area information that is a door-lock lock/unlock code and e-paper information according to the present invention may be stored.

The short-range wireless communication part 220 may include: a first short-range wireless communication part 221 capable of connecting to a wired and wireless data communication network 1 when a smart door lock 60 is an online type; and a third short-range wireless communication part 223 for receiving digital key information from a RFID card 40-1 and a smart terminal 40-2.

In addition, according to another exemplary embodiment, the short-range wireless communication part 220 may include: a second short-range wireless communication part 222 to which a terminal-to-terminal communication protocol such as Bluetooth is applied to communicate with a smart terminal 50; and a third short-range wireless communication part 223 for receiving digital key information from a RFID card 40-1 and a smart terminal 40-2.

In addition, according to yet another exemplary embodiment, the short-range wireless communication part 220 may be provided with a first short-range wireless communication part 221, a second short-range wireless communication part 222, and a third short-range wireless communication part 223, so as to operate selectively by supporting both online and offline types.

The input and output part 230 includes: a lock terminal input part 231 configure to select at least one or more of a plurality of registered door-lock area information, be provided with a plurality of buttons for setting functions according to the present invention, and output, to the lock terminal controller 240, a button signal in response to a corresponding button when the provided button is pressed; and an e-paper part 232 that is a display means for displaying door-lock area information that is e-paper information.

The lock terminal input part 231 may include a number button to input a personal identification number (PIN).

The lock terminal input part 231 may be configured as a single lock terminal input part or a plurality of lock terminal input parts, and may be configured as a capacitive touch pad (not shown) electronically interlocked with the e-paper part 232 on one side (from among upper or lower side end or both side ends) of the e-paper part 232. In this case, for example, when being pressed, the capacitive touchpad is electrically and electronically interlocked with the e-paper part, so that the door-lock area state information such as information on display or color change of occupancy, lecture, campus, business trip, absence, and the like of the e-paper part 232 may be changed according to the previous setting.

The e-paper part 232 may be a Liquid Crystal Display (LCD) that displays only texts in a single color, a graphic LCD capable of displaying texts and images in colors, an organic light emitting diode (OLED), e-paper, and the like, but it may be preferable to apply the e-paper, i.e., electronic paper for displaying specific information even after power is turned off after initial power supply and supplying power only when the displayed information is changed. The door-lock area information may be a graphic image such as a logo or a specific image, so a graphic LCD may be preferable to be used. The method of changing the information displayed on the e-paper part 232 may be changed through online communication with the server, may be changed through an offline-smart terminal (i.e., by means of downloading through e-mail or cloud), and may be changed by a user's touch. In the case of a user's touch, the design may not be changed, and only the door-lock area state information, such as information on display or color change of occupancy, lecture, school, business trip, absence, and the like may be changed.

The approach sensor 290 includes any one or more of an infrared sensor, an ultrasonic sensor, an optical sensor, a heat sensor, and the like, detects an approach of an object or person, and outputs a detection signal to the lock terminal controller 240 when the object or person is detected.

The door lock part 300 is installed on a door to receive control of the lock terminal controller 240 to lock or unlock the door. Since a mechanical configuration of the door lock part 300 is a conventional technique, the mechanical configuration thereof will not be described.

The lock terminal controller 240 includes: a door-lock signal monitoring part 250, a terminal door lock use setting part 260, an e-paper display controller 270, and a smart door lock controller 280, thereby controlling the overall operation of the smart door lock part 60 according to the present invention.

Specifically, the door-lock signal monitoring part 250 monitors whether a door lock signal is received through the short-range wireless communication part 220. The door lock signal may be a door-lock lock/unlock code requesting unlocking of a door lock, or may be door-lock use setting information received from the door-lock management part 30.

A terminal door lock use setting part 260 includes a terminal online mode processing part 261 in the case of an online type, includes a terminal offline mode processing part 262 in the case of an offline type, and includes both of the terminal online mode processing part 261 and terminal offline mode processing part 262 in the case of a dual type supporting both of the online type and offline type, thereby performing a door lock use setting according to the door-lock use setting information.

The e-paper display controller 270 displays at least one or more pieces of door-lock area information, i.e., e-paper information, on the e-paper part 232, provides a means for selecting any one or more pieces of the displayed door-lock area information, receives at least one or more pieces of door-lock area information selected by the lock terminal input part 231, and displays the selected door-lock area information on the e-paper part 232.

In addition, the e-paper display controller 270 may be configured to receive, from a smart terminal 50 of a user, at least one or more pieces of door-lock area information selected by the user using the smart terminal 50 and information on arrangement (i.e., configuration) of the selected door-lock area information, so as to display the information on the e-paper part 232.

When installed in a hotel and the like, the smart door lock part 60 may further include a second lock terminal input part (not shown) including Do not Disturb (DND), and Make Up Room (MUR) of an interior of a door lock area, that is, the interior of a guest room.

In addition, a second input and output part (not shown) including a display means and an input means for setting door-lock area information may be further configured to be included inside a door lock area.

Figure 5:
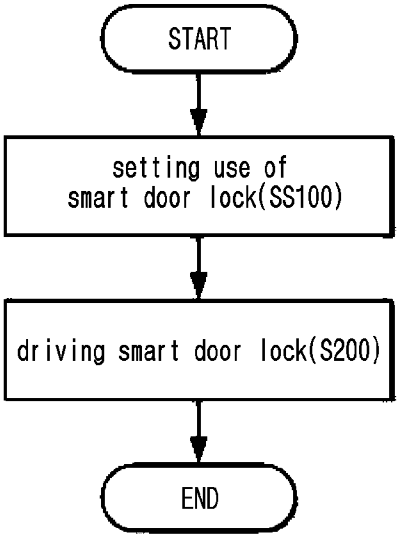
FIG. 5 is a flowchart showing a control method of a smart door lock having the door-lock area information display function according to the present invention.

FIG. 5 is a flowchart showing a control method of a smart door lock having door-lock area information display function according to the present invention.

Referring to FIG. 5, in step S100, when receiving a request to use a door lock area for any door lock area, the door-lock management part 30 provides digital key information for a digital key to a user who have requested the use of the door lock area, generates door-lock area information, and then transmits door-lock use setting information including the door-lock area information to the smart door lock part 60, so as to perform a door-lock use setting in the smart door lock part 60. The digital key information may be provided to an administrator terminal (not shown) and a smart terminal 50 of a user according to the exemplary embodiment.

In step S200, when the smart door lock use setting is completed, the smart door lock part 60 receives, stores, and sets door-lock use setting information including door-lock area information, and displays the door-lock area information on the e-paper part 232, and when a door lock signal including a door-lock unlock code is received, the smart door lock part 60 compares the door-lock unlock code with the preset door-lock lock/unlock code, thereby initiating smart door lock driving to lock or unlock the door lock upon match.

Figure 6:
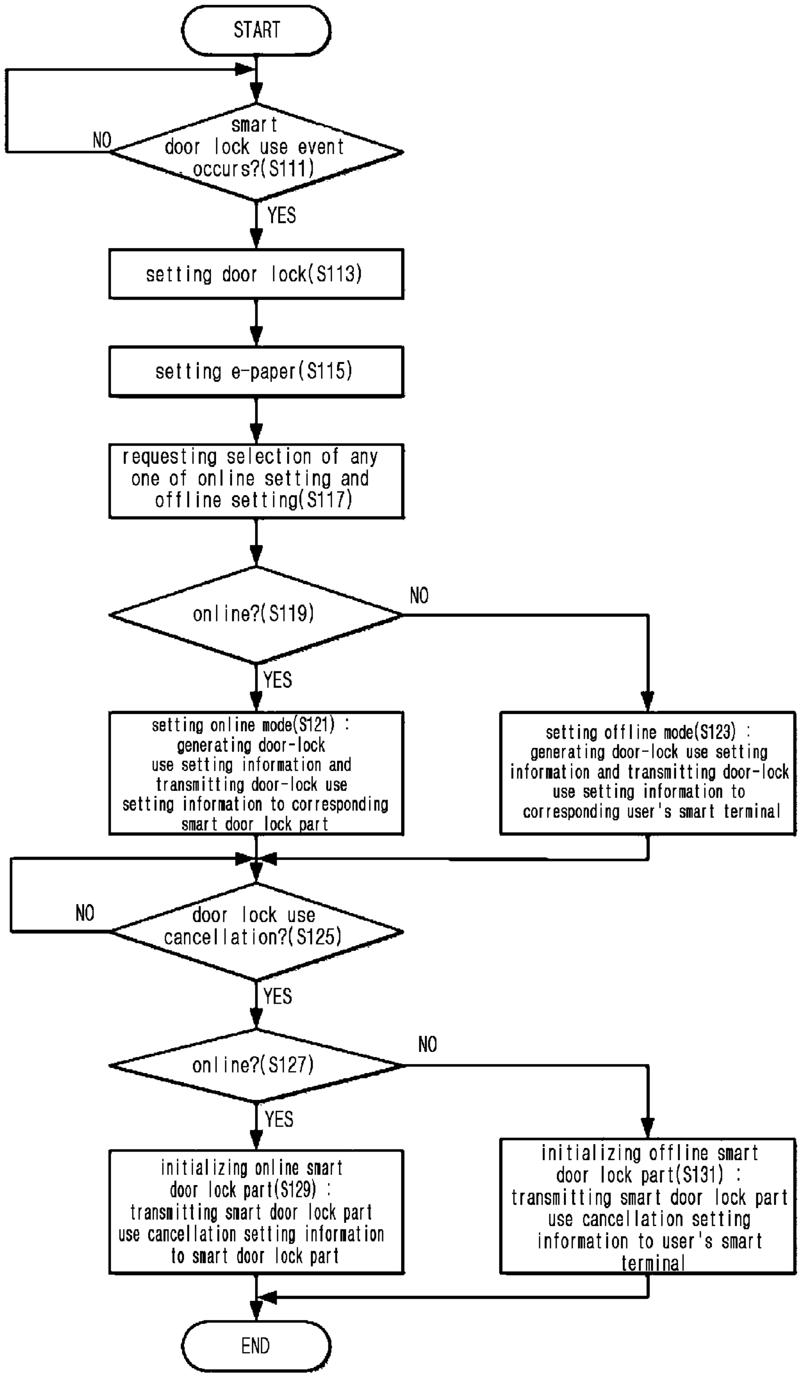
FIG. 6 is a flowchart showing a smart door lock use setting method of the control method of the smart door lock having the door-lock area information display function according to the present invention.

FIG. 6 is a flowchart showing a smart door lock use setting method of the control method of the smart door lock having the door-lock area information display function according to the present invention.

When the smart door lock use setting method is described in detail with reference to FIG. 6, in step S111, the server controller 130 of the door-lock management part 30 monitors whether a smart door lock use event occurs. The smart door lock use event may be generated from an administrator terminal (not shown) or may be generated from a user terminal (not shown) of the user.

In step S113, when the smart door lock use event occurs, the server controller 130 receives a selection of a door lock area to be used by the user, and performs door lock setting for the smart door lock part 60 installed in the selected door lock area.

In step S115, after setting the door lock, the server controller 130 provides an e-paper setting means to an administrator terminal or a user terminal, and obtains and stores e-paper information including at least one or more pieces of door-lock area information through the e-paper setting means.

When the door lock setting and e-paper setting are completed, the server controller 130 performs a door-lock use setting process in which the set door-lock setting information, i.e., the door-lock use setting information including the door-lock lock/unlock code and e-paper information is transmitted to the smart door lock part 60.

In the door-lock use setting process, as shown in FIG. 6 according to the exemplary embodiment, in step S119, the server controller 130 determines whether the smart door lock part 60 in which the door lock is set is an online type or an offline type. The determination of whether the smart door lock part 60 is the online type may be determined by door-lock identification information of the smart door lock part 60 or may be determined by receiving an input of a form of the smart door lock part 60 from an administrator or a user.

In step 121, when the smart door lock part 60 is the online type, the server controller 130 generates door-lock use setting information and performs online mode setting in which the generated door-lock use setting information is transmitted to the corresponding smart door lock part 60.

Whereas, in step S123, when the smart door lock part 60 is the offline type, the server controller 130 generates door-lock use setting information and performs offline mode setting in which the generated door-lock use setting information is transmitted to the corresponding smart terminal 50 of the user.

In addition, in step S125, the server controller 130 monitors whether a door-lock use cancellation request is generated, and in step S127, when the door-lock use cancellation request is generated, the server controller 130 determines whether the smart door lock part 60 is an online type or an offline type, and then in step S129, the server controller 130 performs an online smart door lock part 60 initialization process in which the use cancellation setting information of the smart door lock part 60 is transmitted to the smart door lock part 60.

Whereas, in step S131, when the smart door lock part 60 is the offline type, the server controller 130 performs an offline smart door lock part initialization process in which the use cancellation setting information of the smart door lock part is transmitted to the smart terminal 50 of the user.

Figure 7:
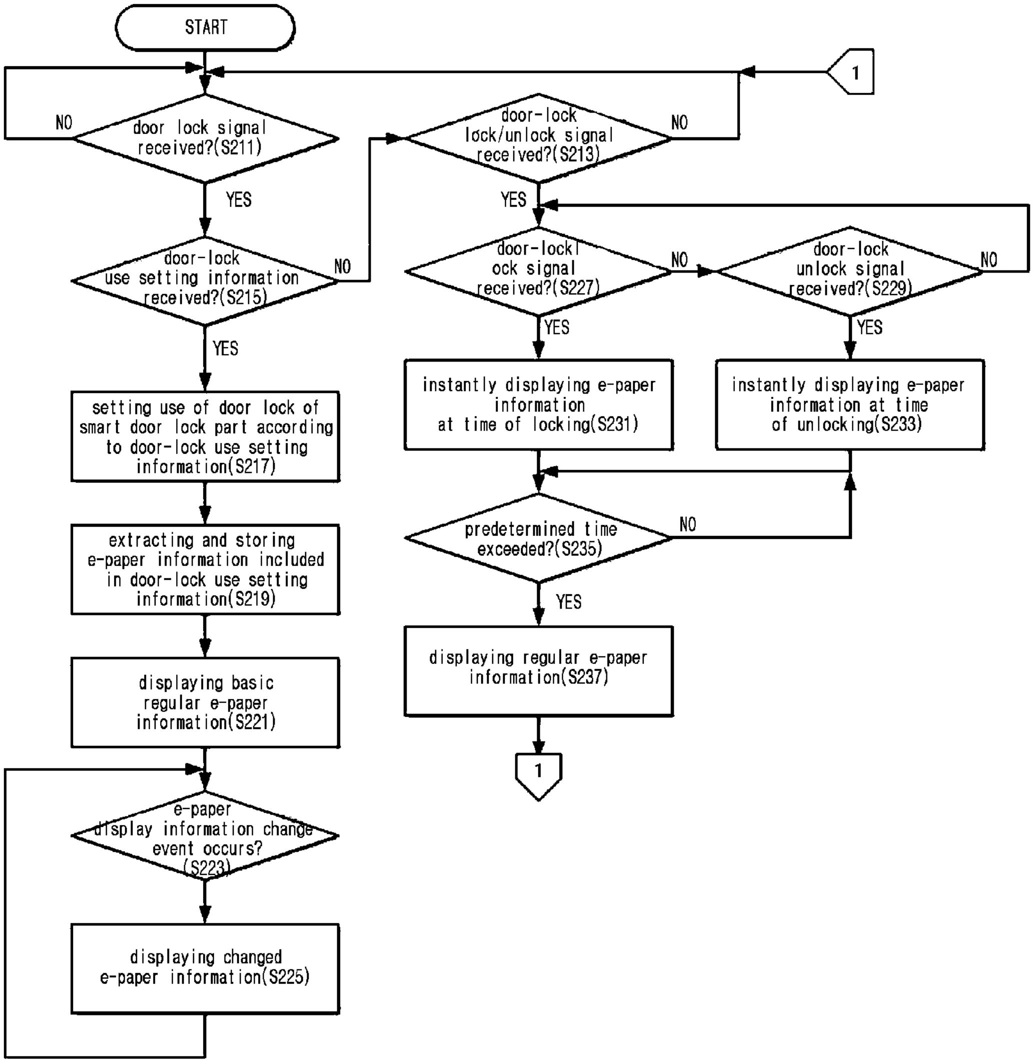
FIG. 7 is a flowchart showing a smart door lock driving method of the control method of the smart door lock having the door-lock area information display function according to the present invention.

FIG. 7 is a flowchart showing a smart door lock driving method of the control method of the smart door lock having the door-lock area information display function according to the present invention.

Referring to FIG. 7, in step S211, the lock terminal controller 240 of the smart door lock part 60 monitors whether a door lock signal is received.

When the door lock signal is received, the lock terminal controller 240 determines whether the received door lock signal is door-lock use setting information (in step S215) or door-lock lock/unlock signal (in step S213).

In step S217, when the received door lock signal is the door-lock use setting information, the lock terminal controller 240 performs the door-lock use setting of the smart door lock part 60 according to the received door-lock use setting information.

After setting the use of the door lock, in step S219, the lock terminal controller 240 extracts e-paper information included in the door-lock use setting information and stores the e-paper information in the lock terminal storage 210, and then in step S221, the lock terminal controller 240 displays door-lock area information, which is basic regular e-paper information, on the e-paper part 232. The basic regular e-paper information is basic e-paper information arbitrarily set by the door-lock management part 30.

After displaying the basic regular e-paper information, in step S223, the lock terminal controller 240 checks whether an e-paper display information change request event occurs, and in step S225, when a change is requested, the lock terminal controller 240 displays, at a location of the selected e-paper, door-lock area information that is e-paper information changed by manipulation of the lock terminal input part 231.

Whereas, in a case where the received door lock signal is a door-lock lock/unlock code received through the third short-range communication part 223, the lock terminal controller 240 determines whether the received door lock signal is a door-lock lock signal (in step S227) or a door-lock unlock signal (in step S229). In general, locking of a door lock is often performed automatically, so it is common to determine whether a door-lock unlock signal is received. Therefore, the door-lock lock signal may be generated as an event in the smart door lock part 60.

When a door-lock lock signal or a door-lock lock event occurs, in step S231, the lock terminal controller 240 instantly displays the e-paper information on the e-paper part 232 at a time of locking. For example, the e-paper information according to the locking may be changed from "Occupancy" to "Absence".

Whereas, in a case where a door-lock unlock signal is received, in step S233, the lock terminal controller 240 instantly displays the e-paper information on the e-paper part 232 at a time of unlocking.

In step S235, the e-paper information may be displayed only for a predetermined period of time.

After the e-paper information is displayed according to the locking or unlocking for the predetermined time, the lock terminal controller 240 displays the regular e-paper display information on the e-paper part 232. The regular e-paper display information may be the same as or different from the last changed e-paper information.

In addition, the lock terminal controller 240 may be configured to display the e-paper information only when an object or a person approaching a door is detected through the approach sensor 290.

Figure 8:
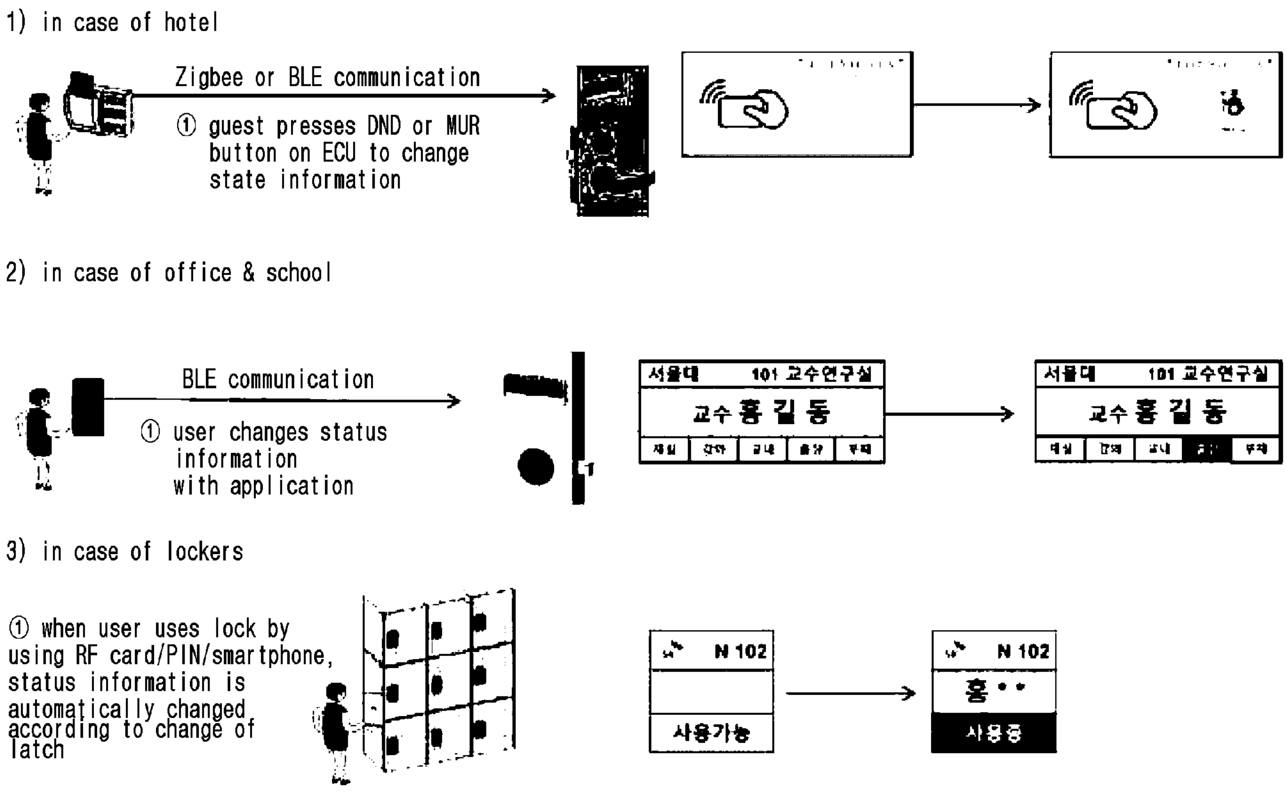
FIG. 8 is a view showing an updating method of door-lock area state information according to an exemplary embodiment of the present invention.

FIG. 8 is a view showing an updating method of door-lock area state information according to the exemplary embodiment of the present invention. The updating method of door-lock area state information according to the present invention will be described in more detail with reference to FIG. 8.

First, in the case of a hotel, when a hotel guest or hotel manager presses a DND or MUR button of the lock terminal input part 231 wirelessly connected to the smart door lock part 60 through any one of Zigbee and Bluetooth Low Energy (BLE), the lock terminal controller 240 changes and displays user state information, which is door-lock area state information displayed on the e-paper part 232.

In addition, in the case of an office and school, when a user changes user state information by using an application after connecting to the smart door lock part 60 through wireless communication such as BLE through the applications installed in his/her own smart terminal 50, the lock terminal controller 240 changes the previously displayed user state information, which is the door-lock area state information, to the user state information selected by the user.

In addition, in the case of a locker, when a user inputs the RF card and PIN through the lock terminal input part 231 or changes the state of a locker through the smart terminal 50, the lock terminal controller 240 of the smart door lock part 60 locks or unlocks the locker by moving a latch of the door lock part 300, and automatically changes state information accordingly and displays the state information on the e-paper part 232.

Meanwhile, the present invention is not limited to the typical preferred exemplary embodiments described above, but those skilled in the art will be able to understand that various improvements, changes, substitutions, or additions can be made within the scope of the present invention without departing from the spirit of the present invention. When implementation by such improvement, change, substitution, or addition falls within the scope of the appended claims below, the technical idea should also be regarded as belonging to the present invention.

What is claimed is:

1. A smart door lock system having a door-lock area information display function, the smart door lock system comprising:

a smart door lock part comprising a door lock installed on a door of a smart lock application part having a door lock area to lock and unlock the door, and an e-paper part that is a display means, the smart door lock part being configured to display door-lock area information on the e-paper part after receiving, storing, and setting door-lock use setting information comprising the door-lock area information, compare a door-lock unlock code with a preset door-lock lock/unlock code upon reception of a door lock signal comprising the door-lock unlock code, and lock or unlock the door lock upon match; and a door-lock management part configured to store door-lock identification information of the smart door lock part for at least one or more door lock areas, manage the door lock area, provide digital key information on a digital key to a user who requested to use the door lock area when use of the door lock area is requested for any door lock area, generate the door-lock area information, and then transmit the door-lock use setting information comprising the door-lock area information to the smart door lock part, wherein the smart door lock part comprises:

a lock terminal storage configured to store the door-lock lock/unlock code and the door-lock use setting information comprising the door-lock area information;

a short-range wireless communication part configured to receive and output the door-lock lock/unlock code and the door-lock use setting information;

the door lock;

an input and output part comprising the e-paper part; and a lock terminal controller configured to display the door-lock area information on the e-paper part after receiving the door-lock use setting information comprising the door-lock area information to store and set the door-lock use setting information in the lock terminal storage, compare the door-lock unlock code with the preset door-lock lock/unlock code upon reception of the door lock signal comprising the door-lock unlock code, and control the door lock upon match to lock or unlock the door lock, wherein the smart door lock system further comprises a lock terminal input part installed in the door lock area and configured to receive and display the door-lock area information set from the smart door lock part, comprise a state change button so as to transmit area-state information change information requesting a change of the door-lock area information when the state change button is pressed, and receive and display the changed door-lock area information accordingly, and wherein the lock terminal controller receives the area-state information change information through the short-range wireless communication part, sequentially changes at least two or more pieces of the door-lock area information, displays the door-lock area information on the e-paper part, and transmits the changed door-lock area information to the lock terminal input part.

2. The smart door lock system of claim 1, wherein the digital key comprises any one or more of components comprising:

a RFID card configured to store the door-lock lock/unlock code, and transmit a door-lock lock/unlock signal comprising the door-lock lock/unlock code upon contact with the smart door lock part; and a smart terminal configured to receive and store the door-lock lock/unlock code from the smart door lock part, and transmit the door-lock lock/unlock signal comprising a door-lock lock code or the door-lock unlock code to the smart door lock part when locking or unlocking the door lock is requested by the user in the door lock area.

3. The smart door lock system of claim 1, wherein the short-range wireless communication part comprises a first short-range wireless communication part wirelessly connected to a wired and wireless data communication network to access an Internet network, and the lock terminal controller receives the door-lock use setting information through the first short-range wireless communication part.

4. The smart door lock system of claim 1, wherein the door-lock management part transmits the door-lock use setting information to a smart terminal of the user, the short-range wireless communication part of the smart door lock part comprises a second short-range wireless communication part configured to perform terminal-to-terminal wireless communication, and the lock terminal controller receives the door-lock use setting information from the smart terminal through the second short-range wireless communication part.

5. The smart door lock system of claim 1, wherein the e-paper part is configured to shut off power supply after initial power supply, express display data even when power is shut off, and supply the power only when the display data is changed.

6. The smart door lock system of claim 1, wherein the door-lock area information comprises any one or more pieces of information including logo, door-lock area user information, room number, user state information, welcome phrase, lock number, power information, battery capacity information, user request information (i.e., hotel DND or MUR), and a lock terminal controller simultaneously or sequentially displays, on the e-paper part, the information including the logo, door-lock area user information, room number, user state information, welcome phrase, lock number, power information, battery capacity information, user request information (i.e., hotel DND or MUR).

7. The smart door lock system of claim 1, wherein the lock terminal input part further comprises a capacitive touch pad electronically interlocked with the e-paper part on one side of the e-paper part.

8. The smart door lock system of claim 1, wherein the input and output part further comprises a lock terminal input part comprising a state change button for changing the door-lock area information, and the lock terminal controller sequentially changes two or more pieces of the door-lock area information each time the state change button of the lock terminal input part is pressed for input and displays the door-lock area information on the e-paper part.

9. The smart door lock system of claim 8, wherein the lock terminal input part further comprises a capacitive touch pad electronically interlocked with the e-paper part on one side of the e-paper part.

* * * * *